(12) United States Patent
Bradley et al.

(10) Patent No.: US 12,530,759 B2
(45) Date of Patent: Jan. 20, 2026

(54) SYSTEM AND METHOD FOR POINT CLOUD GENERATION

(71) Applicants: Sony Interactive Entertainment Europe Limited, London (GB); University of York, York (GB)

(72) Inventors: Timothy Bradley, London (GB); Marina Villanueva Barreiro, London (GB); Oliver Hume, London (GB); Ryan Spick, Sheffield (GB); James Walker, York (GB)

(73) Assignees: Sony Interactive Entertainment Europe Limited, London (GB); University of York, York (GB)

( * ) Notice: Subject to any disclaimer, the term of this patent is extended or adjusted under 35 U.S.C. 154(b) by 190 days.

(21) Appl. No.: 18/285,462

(22) PCT Filed: Mar. 2, 2022

(86) PCT No.: PCT/EP2022/055247
§ 371 (c)(1),
(2) Date: Oct. 3, 2023

(87) PCT Pub. No.: WO2022/214245
PCT Pub. Date: Oct. 13, 2022

(65) Prior Publication Data
US 2024/0193747 A1 Jun. 13, 2024

(30) Foreign Application Priority Data
Apr. 7, 2021 (GB) .................................. 2104923

(51) Int. Cl.
*G06T 7/50* (2017.01)
*G06T 7/00* (2017.01)
*G06T 17/00* (2006.01)

(52) U.S. Cl.
CPC ............ *G06T 7/0002* (2013.01); *G06T 17/00* (2013.01); *G06T 2207/10028* (2013.01);
(Continued)

(58) Field of Classification Search
CPC .................. G06T 7/0002; G06T 17/00; G06T 2207/10028; G06T 2207/20081;
(Continued)

(56) References Cited

U.S. PATENT DOCUMENTS

2018/0341836 A1* 11/2018 Lim .................... G06F 18/2413
2020/0314435 A1* 10/2020 Tourapis .................. G06T 7/74
(Continued)

FOREIGN PATENT DOCUMENTS

CN 111724478 A 9/2020
CN 112634456 A 4/2021

OTHER PUBLICATIONS

Han Xian-Feng et al.: "Image-Based 3D Object Reconstruction: State-of-the-Art and Trends in the Deep Learning Era", IEEE Transactions on Pattern Analysis and Machine Intelligence, IEEE Computer Society, USA, vol. 43, No. 5, Nov. 21, 2019 (Nov. 21, 2019), pp. 1578-1604, XP011846638.
(Continued)

*Primary Examiner* — Xiao M Wu
*Assistant Examiner* — George Renze
(74) *Attorney, Agent, or Firm* — Fish & Richardson P.C.

(57) ABSTRACT

A method of point cloud generation comprises generating, by a processor, a first point cloud comprising a first set of generated data points; calculating, by the processor, a loss function representative of the quality of the first point cloud, the loss function comprising a smoothness term obtained by constructing vectors between neighbouring data points in the point cloud, performing vector multiplication between neighbouring pairs of vectors, and outputting a smoothness
(Continued)

term based on the result of the vector multiplication; and generating, by the processor, a second point cloud comprising a second set of generated data points based at least in part on the calculated loss function of the first point cloud.

13 Claims, 4 Drawing Sheets

(52) U.S. Cl.
CPC ............... *G06T 2207/20081* (2013.01); *G06T 2207/20084* (2013.01); *G06T 2207/30168* (2013.01); *G06T 2210/56* (2013.01)

(58) Field of Classification Search
CPC . G06T 2207/20084; G06T 2207/30168; G06T 2210/56; G06T 7/50
See application file for complete search history.

(56) References Cited

U.S. PATENT DOCUMENTS

| | | | |
|---|---|---|---|
| 2021/0241470 A1* | 8/2021 | Tang | G06F 18/251 |
| 2022/0319675 A1* | 10/2022 | Mork | G06N 3/0475 |
| 2022/0351332 A1* | 11/2022 | Jia | G06F 30/23 |
| 2023/0047211 A1* | 2/2023 | Abuelwafa | G06T 7/64 |

OTHER PUBLICATIONS

Kato Hiroharu et al: "Neural 3D Mesh Renderer", 2018 IEEE/CVF Conference on Computer Vision and Pattern Recognition, IEEE, Jun. 18, 2018 (Jun. 18, 2018), pp. 3907-3916, XP033476362.
International Search Report including Written Opinion for PCT/EP2022/055247 mailed Jul. 8, 2022. 15 pgs.
Combined Search and Examination Report for Application No. GB2104923.4 dated Oct. 5, 2021. 8 pgs.

* cited by examiner

SYSTEM AND METHOD FOR POINT CLOUD GENERATION

CROSS REFERENCE TO RELATED APPLICATIONS

The present application is a national phase entry under 35 U.S.C. § 371 of International Application No. PCT/EP2022/055247 filed on Mar. 2, 2022, now published as WO 2022/214245 A1, which claims priority from European Patent Application No. 2104923.4 filed on Apr. 7, 2021, all of which are hereby incorporated herein by reference in their entireties.

BACKGROUND OF THE INVENTION

Field of the Invention

The present invention relates to a system and method for point cloud generation.

Description of the Prior Art

A point cloud is a form of data consisting of a set of data points in space, each data point comprising three-dimensional coordinates. The set of data points typically represent an object, a collection of objects, or a scene.

Point clouds are useful in animation, rendering and visualization applications, where data points having a well-defined position in space can be used to generate and manipulate 3D objects and scenes. Point clouds are increasingly used in the video game industry to represent characters and scenes, which can be animated and/or controlled by the user. Other example applications of point clouds include creating 3D CAD models, geographical surveyance and metrology analysis.

Point clouds can be produced in many different ways. One of the most common methods for producing a point cloud is through 3D scanning of a 'real-life' object or scene. For example, a LiDAR system can be used to send laser pulses to the surfaces of an object or scene, and the properties of the reflected pulse (e.g. intensity, TOF, flight angle) are measured to generate a set of 3D data points of the object or scene. However, this approach merely reconstructs an object or scene already present in the real world and does not allow the generation of new models directly in point cloud space.

Various techniques can be employed to generate new point clouds which do not exist in a given dataset. One technique of interest is the generation of new point clouds by generative networks. Generative networks are a subset of neural networks which learn the underlying distribution of a dataset, or an approximation thereof, and sample this distribution to generate new examples of the data. Another technique involves the generation of new point clouds by a variational autoencoder.

Whilst current techniques for generating sets of three-dimensional data points enable new possibilities for producing high quality point clouds which can be used in many applications, owing to the stochastic nature of such generation techniques the resulting point clouds often incorporate noisy surfaces, and the neural networks are very slow to reach an acceptable quality of useful output.

The present invention seeks to address or mitigate at least some of the above problems.

SUMMARY OF THE INVENTION

According to a first aspect of the disclosure there is provided a method comprising: generating, by a processor, a first point cloud comprising a first set of generated data points; calculating a loss function representative of the quality of the first point cloud, the loss function comprising a smoothness term (S) obtained by constructing vectors between neighbouring data points in the point cloud, performing vector multiplication between neighbouring pairs of vectors, and outputting a smoothness term based on the result of vector multiplication; and generating, by the processor, a second point cloud comprising a second set of generated data points based at least in part on the calculated loss function of the first point cloud.

The smoothness term in the loss function calculated according to the above method provides a reliable measure of how well the three-dimensional data points in the generated point cloud are aligned with each other. This information is particularly useful in assessing the quality of a three-dimensional model produced by one or more neural networks trained to generate a point cloud. The same method can be applied to systems designed to reconstruct a three-dimensional model from one or more two-dimensional image inputs.

By constructing a loss function which specifically includes a smoothness term to track the level of noise on the surfaces of the object represented by the generated point cloud, the generation of point clouds can be parameterised through this smoothness term and be optimised based at least in part on the smoothness parameter. For example, in the case of generative networks, a first point cloud can be generated, its quality assessed through the loss function (which includes a smoothness regularisation term), and the generative network can be trained based on the resulting loss function to produce a second point cloud with an improved quality. This allows the generation of point clouds representing objects having significantly smoother surfaces, and also facilitates a significant speed increase in the generation of acceptable output point clouds in a generative network.

By 'vector multiplication' here it is intended to mean an operation between two vectors which multiplies some directional component of one vector with another component of the other vector. Vector operations which give some measure of the directional alignment between two vectors—wherein the magnitude of the result is dependent on the angle between the two vectors—are particularly suitable for this purpose.

In particular, the smoothness term for the point cloud may be obtained by taking an average value of a dot product between neighbouring vectors in the point cloud. It has been found that a dot product provides a good measure of the alignment of vectors constructed between neighbouring pairs of data points in the point cloud. A dot product is a fast and reliable operation that can be calculated across the point cloud dataset where needed. Other operations, such as a vector cross product (which is proportional to the sine of the angle between two vectors rather than the cosine of the dot product) can similarly be employed with modifications to normalise the scale and output a scalar value.

Whilst the smoothness term can in principle take one of several different forms, preferably the smoothness term may be calculated as:

$$S = 1 - \left| \frac{\sum_{i=0}^{n-1} v_i \cdot v_{i+1}}{n} \right|$$

where $v_i$ and $v_{i+1}$ are neighbouring pairs of vectors each constructed between neighbouring data points in the point cloud, and n is a total number of vectors constructed in the data point set.

When constructing the vectors between neighbouring data points in the point cloud and taking a vector multiplication between such vectors, there may often be many available options for the specific data points between which vectors can be constructed. Furthermore, there may be many different combinations of such vectors that can be paired and assessed via vector multiplication. Typically, the neighbouring vectors may be immediately adjacent to each other in the point cloud. By immediately adjacent, it is intended to mean that two vectors are positioned such that no other pair of points—other than those connected by each of the respective vectors—are located in the space between them.

Alternatively, the neighbouring vectors can be taken from a general vicinity without being exactly adjacent to each other in the point cloud. For example, a vector can be 'vector multiplied' with another vector which is separated by one or more data points in the point cloud. The separation of the vectors to be examined within the calculation of the loss function may be pre-determined, for example by a threshold distance that may be an absolute value or a proportion of a dimension of the overall point cloud. In some implementations, the spatial separation of the vectors to be examined may be controlled by the user. For example, the user may be provided with a sliding scale or an input where the user may input a desired separation—measured e.g. by a jitter amount. The area in space within which vectors are generated and then multiplied together may be characterised by a vicinity control, specified by the user. The method above may therefore comprise an initial step of receiving, from a user, an input vicinity control, and vector multiplication may be carried out between vectors within a spatial vicinity corresponding to the input vicinity control.

As mentioned above, the method according to the first aspect may be applied to any process which involves the generation of point clouds having three-dimensional data points representing an object, in which a loss or cost function is used to refine the generation process. The method is particularly advantageous in machine learning applications employing for example one or more generative networks to produce a point cloud.

The step of generating a first point cloud may comprise inputting a noise vector to a generator of a generative adversarial network, GAN, trained to generate the first set of generated data points and output the first point cloud. Similarly, the method may employ a plurality of GANs working in parallel or series to generate and discriminate point clouds. The one or more GANs may be stored on a memory connected to and/or accessible by the processor. In such a case, the processor may be configured to access the memory to operate the one or more GANs when required.

The step of calculating a loss function may comprise the steps of: inputting the first point cloud to a discriminator of the GAN, trained to analyse the point cloud and output a discriminator loss term; calculating the smoothness term; and combining a pre-determined ratio of the discriminator loss term and the smoothness term to form the loss function. The steps outlined above may be executed in any permutation of order, and the discriminator loss term and smoothness term may be combined at any ratio. In some examples, the ratio of the discriminator and smoothness terms may be variable, and may be adjusted by the network in accordance with the result of operation. Typically, the loss function may be formed of the discriminator loss term and the smoothness term combined at a ratio of 8:2.

According to a further aspect of the disclosure there is provided a computer program comprising computer-implemented instructions that, when run on a computer, cause the computer to implement the method according to the first aspect, with any one or more of the above features.

According to a further aspect of the disclosure there is provided a system comprising one or more processors comprising: a point cloud generation unit, configured to generate a first point cloud comprising a first set of generated data points; a loss function determining unit, configured to calculate a loss function representative of the quality of the first point cloud, the loss function comprising a smoothness term obtained by constructing vectors between neighbouring data points in the point cloud, perform vector multiplication between neighbouring pairs of vectors and output a smoothness term based on the result of vector multiplication, wherein the point cloud generation unit is further configured to generate a second point cloud comprising a second set of generated data points based at least in part on the calculated loss function of the first point cloud.

According to a further aspect of the disclosure there is provided a system for point cloud generation comprising a point cloud generation processor adapted to generate point clouds using a machine learning system previously trained using techniques and corresponding systems described herein.

It will be appreciated that the computer program and systems according to the above aspects may utilise any of the features and modifications described above with respect to the first aspect of the disclosure, associated with corresponding advantages and effects.

BRIEF DESCRIPTION OF THE DRAWINGS

The invention will now be described by way of examples with reference to the accompanying drawings, in which.

DETAILED DESCRIPTION

Figure 1:
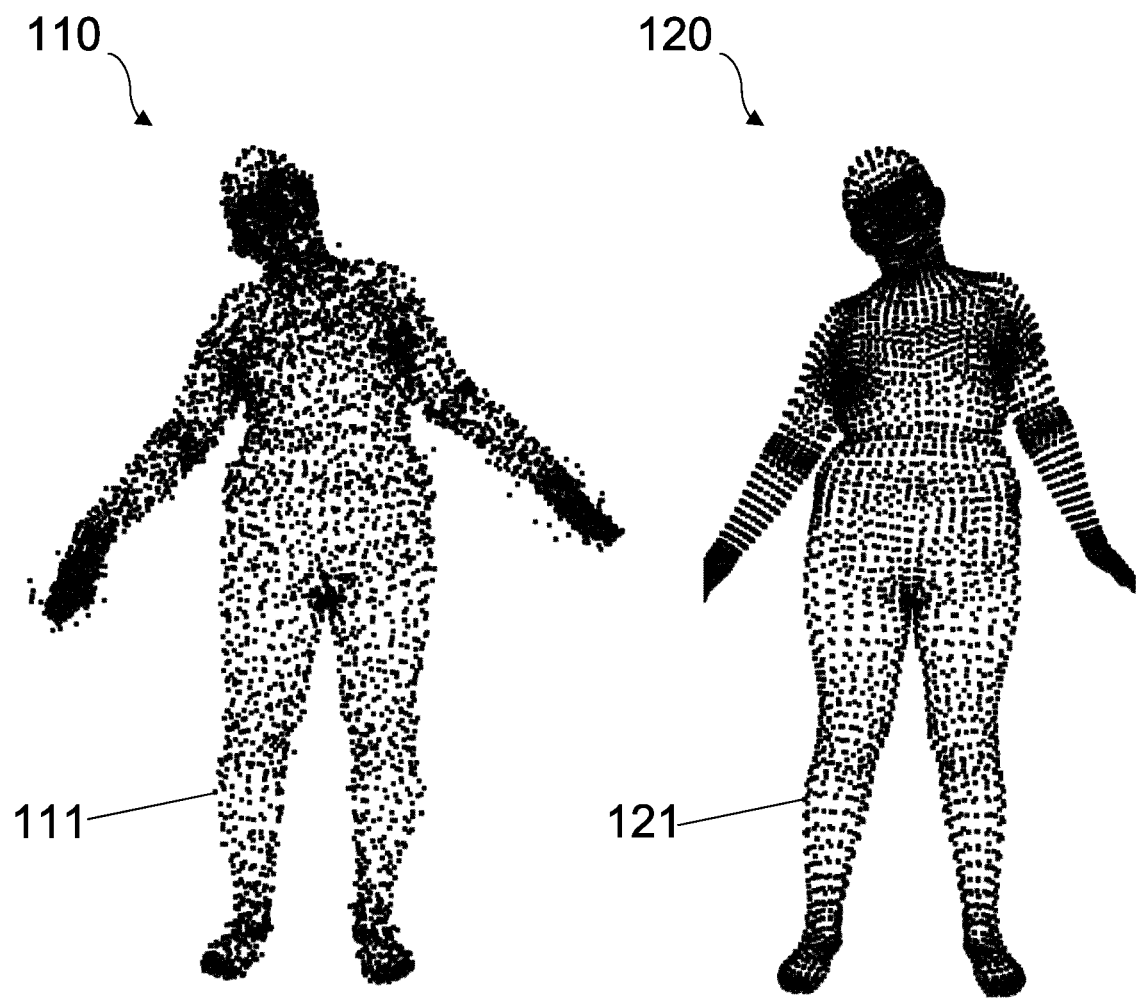
FIG. 1 schematically illustrates examples of point clouds comprising data points representative of a three-dimensional human model.

Two example point clouds are illustrated in FIG. 1: a first point cloud 110 consisting of data points 111, and a second point cloud 120 consisting of data points 121. The first point cloud 110 was obtained by training the generator of a generative adversarial network (GAN) to generate a point cloud. The second point cloud 120 was obtained through high-resolution scans of human models.

It can be seen from the figure that the data points in the two point clouds generally represent the same or similar human model in the same pose. However, the first and second point clouds 110, 120 have been generated through different processes and a resulting difference in quality of the three-dimensional model is apparent. For example, the three-dimensional surfaces represented by the data points 121 in the second point cloud appear smoother than the corresponding data points 111 in the first point cloud 110. That is to say, data points 121 in the second point cloud 120 are arranged such that data points 121 on a given surface are much more locally aligned than the data points 111 on the corresponding surface in the first point cloud 110. As a result, the first point cloud 110 appears to have rough surfaces and is fuzzier overall, whereas the second point cloud 120 is well defined and appears to have smoother surfaces. It can thus be seen from FIG. 1 that the arrangement of the data points within a point cloud representative of a 3D model has a strong influence on the overall visual impression of the model. A more uniform and structured arrangement of data points, such as the data points 121 in point cloud 120 leads to a smoother appearance of the overall model. When utilising a process for generating new point clouds, for example by the use of one or more trained neural networks, it is desirable to have the ability to generate 'acceptable' point clouds as quickly and efficiently as possible. The criteria on which acceptability is defined can vary depending on the use, but generally (and particularly in the field of generating point clouds representative of human models) it is desired that the point cloud has smooth surfaces. In other words, that the data points within the point cloud are well structured so as to give a better overall visual impression such as cloud 120.

Figure 4:
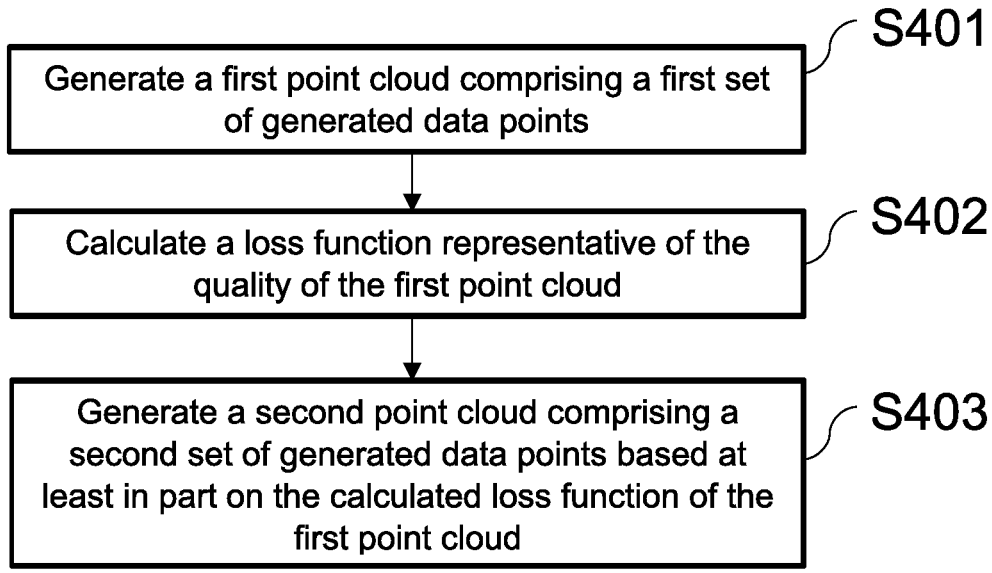
FIG. 4 schematically illustrates an example flow diagram of a method in accordance with an aspect of the disclosure.

An aspect of the present disclosure is a method for generating a point cloud. The method is normally applied during a process in which a trained generative adversarial network (GAN) is used to generate a new point cloud from random noise data. However, the method can be applied in any process involving the generation of a point cloud with 3D data points arranged to represent an object or scene. A flowchart of an exemplary method is shown in FIG. 4, wherein the method includes the following steps.

Step S401: Generate a first point cloud comprising a first set of generated data points.

This first point cloud can be generated by use of any desired technique. For example, the point cloud may be derived from a three-dimensional scan of an object or scene via one or more sensors arranged to receive light reflected from the object or scene. This can be achieved by one or more LIDAR systems or the like, wherein lasers are projected onto the object or scene and reflected back to a sensor, and properties of the reflected ray such as time-of-flight are measured to produce resulting data points representative of the surface at which it was reflected. Data points can also be generated through use of one or more optical cameras, whereby still images captured by the one or more cameras is analysed to produce data points representative of an object or scene within the field of view of the cameras. The point cloud may thus be obtained either by being generated directly, or may be obtained in any suitable fashion, e.g. from a library of such point clouds, or by processing depth data obtained from a virtual environment.

The point cloud can also be generated analytically, by generating data points within an arbitrary three-dimensional space. At a simple level this can be achieved by placing data points individually within the 3D space (i.e., assigning data points position information and other physical parameters) to construct a point cloud representing an object or scene.

One technique of interest is to employ one or more neural networks to generate the point cloud. In particular, as noted above, a point cloud can be generated by a GAN trained on training point cloud data. A GAN typically comprises a generator neural network configured to generate candidate point clouds, and a discriminator neural network configured to evaluate the candidate point clouds generated by the generator. The networks are trained on training point cloud data (normally obtained through one of the scanning or 3D modelling techniques described above, for example) so that the generator leans to map from an input latent space vector to a new point cloud which fools the discriminator into evaluating it as part of the expected distribution representative of (or similar to) the training data set.

In the description of the following steps, many features of the method and system will be described in respect of the invention when applied within a GAN system. However it will be appreciated that, as noted above, these techniques can be equally applied to other processes of generating point clouds. For example an alternative machine learning method is generation by a variational autoencoder (VAE).

Step S402: Calculate a loss function representative of the quality of the first point cloud.

The loss function provides a measure of how well the generated point cloud fits within the expected distribution representative of the training cloud data. The function typically outputs a real number value which represents the extent to which the generated point cloud deviates from (or correlates with, depending on perspective) what would be perceived as an acceptable point cloud.

In the case that the first point cloud is generated by a GAN, the loss function can be calculated at the discriminator to decide whether the generated point cloud is acceptable or not. For example, the loss function can be calculated for each generated point cloud and then compared against a threshold value so that the discriminator can make the decision whether or not to accept that candidate point cloud based at least in part on whether or not the calculated loss function value exceeds the threshold. The loss function value for each candidate can be fed back to the generator to train the generator to improve the quality of the next point cloud it generates.

The loss function generally includes a standard binary cross entropy (BCE) term and a smoothness term, which will be described below in relation to FIG. 5. The ratio of the smoothness term within the loss function compared to the other terms (such as the BCE term) can be adjusted to provide a desired corresponding effect. In one example, the smoothness term is weighted so as to make up 20% of the loss function, with the BCE term making up 80% of the loss function weighting. The weighting of the smoothness term within the loss function can be set as a pre-defined value before the method is performed. Alternatively, the weighting can be a variable input by a user before the process begins or adjusted dynamically while the process is in operation.

Step S403: Generate a second point cloud comprising a second set of generated data points based at least in part on the calculated loss function of the first point cloud.

The loss function calculated for the first point cloud is used by the entity which generated that point cloud (the generator in the case of a GAN) to learn and attempt to generate a second point cloud which has improved characteristics compared to the first point cloud. The aim is to learn to improve the distribution of data points within the point cloud such that the second point cloud as an improved loss function value compared to the first point cloud.

It will be appreciated that therefore more generally the first and second point clouds may be generated by a machine learning system (of which a GAN is an illustrative example, as noted previously herein), which is updated responsive to the loss function between generation of the first and second point clouds.

The steps S401, S402 and S403 can be performed repeatedly so that successive generated point clouds become more indistinguishable from the expected distribution representative of the training data set, for example. In other words, the process can be repeated until a point cloud is generated which comprises data points representing a 3D model which is of acceptable quality. This can be determined by setting a threshold value for the loss function, for example, above or below which a candidate generated point cloud can be said to be acceptable. A threshold may also be set independently for the smoothness term, and/or the BCE term within the loss function.

In the case of implementation by a GAN or other generative machine learning models, one or more resulting neural networks (or ML models) which have been trained by iterations of generating a candidate point cloud and learning through the game played by the discriminator and generator, for example, can be an output of the process. The resulting generative neural networks (or models) can be extracted from the process and used to generate new point clouds.

Figure 5:
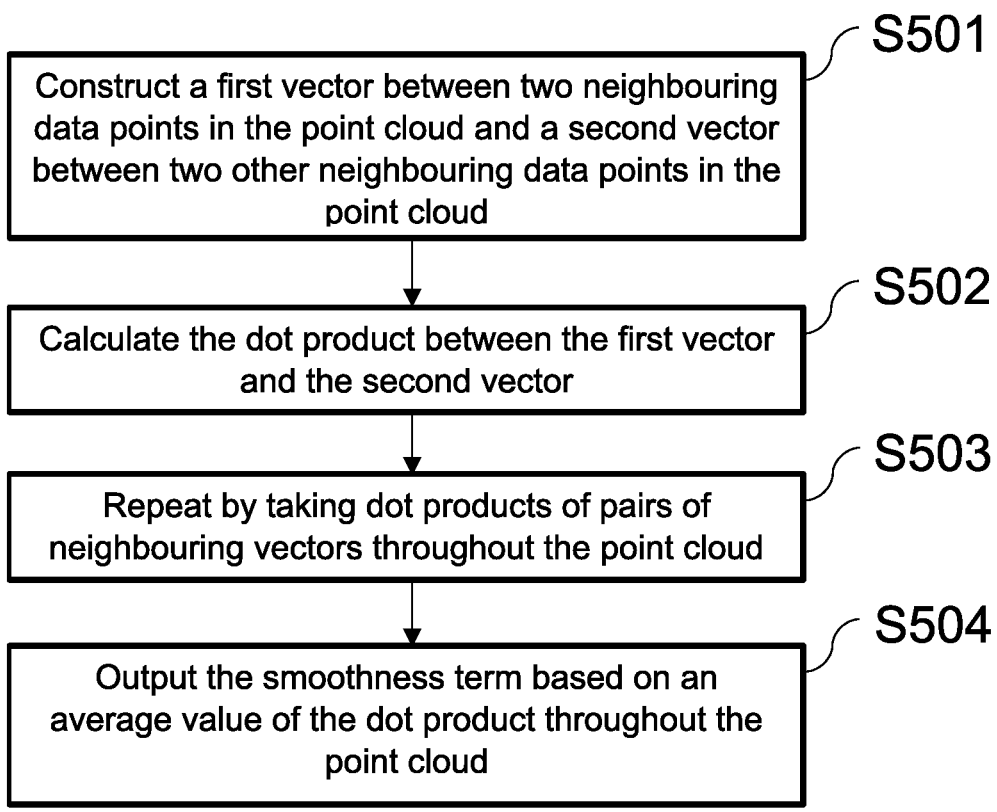
FIG. 5 schematically illustrates an example flow diagram of a method in accordance with an aspect of the disclosure.

When executing the above step S402 of calculating a loss function representative of the quality of the first point cloud, the step S402 may be specifically implemented by performing the following steps illustrated in the flowchart of FIG. 5.

Step S501: Construct a first vector between two neighbouring data points in the point cloud and a second vector between two other neighbouring data points in the point cloud.

Figure 2:
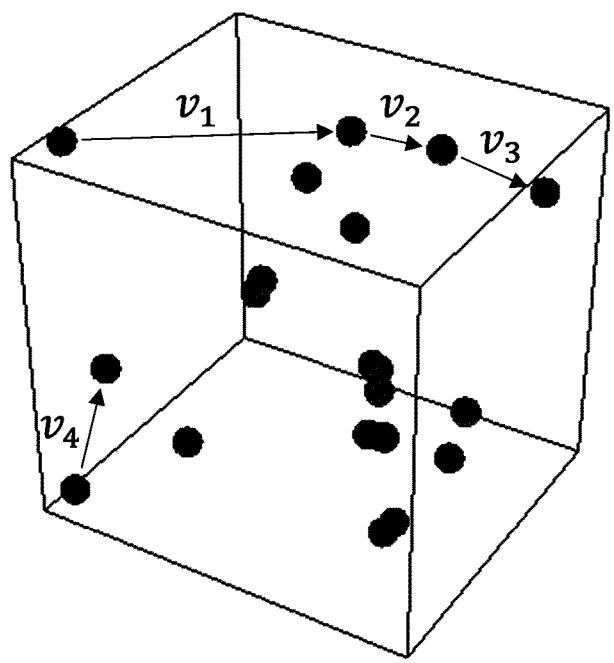
FIG. 2 schematically illustrates an example arrangement of vectors selected in a close-up view of a sample of data points in an example point cloud.

The construction of vectors between data points in the point cloud can be understood by reference to FIG. 2 which shows an exemplary distribution of data points within a point cloud.

In the illustrative example shown in FIG. 2, a first vector v1 is constructed between a first data point and a second data point in the point cloud, and a second vector v2 is constructed between the second data point and a third data point in the point cloud. Whilst in this example the first and second vectors share a common data point (i.e., the second data point) such that they are connected and spatially adjacent, the first and second vectors may not necessarily be adjacent or be connected to a common data point. The first and second vectors can be constructed between any two pairs of data points within the data point. As an illustrative example, a vector v4 can be constructed between a pair of data points which are totally unconnected to the first, second or third data points and is spatially in a different location to these data points, and this vector can be used as the second vector to be multiplied with the first vector. The choice of how spatially separated the first and second vectors are can be made according to the desired result. For example, a constraint could be that the first and second vectors are constructed so that they are separated from each other by a distance of one data point.

Step S502: Calculate the dot product between the first vector and the second vector.

Taking the first vector v1 and second vector v2 constructed in step S501, a scalar dot product between the two vectors is calculated. The calculated dot product is stored in the memory.

As the vectors v1 and v2 are aligned in similar directions, it can be easily seen in this particular example that the dot product would return a normalised result close to 1. In contrast, if a dot product is taken between first vector v1 and vector v4, the normalised result can be expected to be closer to 0, as it can be seen that the directions of v1 and v4 are not aligned. In this way, the dot product provides a measurement of the smoothness of a surface represented by a set of data points within a point cloud.

In a similar manner, other vector operations can be applied to provide a measure of the structure of data points within the point set. Like the dot product, which is proportional to the cosine of the angle between two vectors, operations which indicate the angle between two constructed vectors are preferable. For example, other vector multiplications such as a vector cross product can be taken to provide a measure of the alignment of two constructed vectors and therefore a measure of the structure of the data points.

Step S503: Repeat by taking dot products of pairs of neighbouring vectors throughout the point cloud.

Once the dot product is taken between vectors v1 and v2 for example, a dot product is taken between a next pair of vectors. Following on from the above example, a third vector v3 is constructed between the second data point and a third data point, and its dot product is taken with the second vector v2. Each time a dot product is calculated, its result is stored in a memory of the system. The process is repeated throughout the distribution of data points within the point cloud, or throughout a set of datapoints within a selected region of the point cloud.

Figure 3:
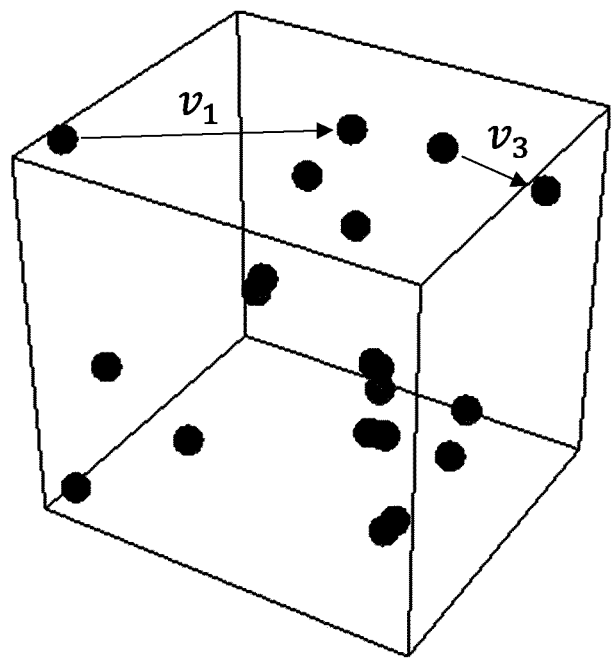
FIG. 3 schematically illustrates another example arrangement of vectors selected in a close-up view of a sample of data points in an example point cloud.

In this example, three vectors v1, v2 and v3 have been constructed between consecutive data points in the data set. In such an arrangement the vectors v1, v2 and v3 form a connected line. In practice, such a set of consecutive data points may for example represent data points on the surface or edge of a model object or scene represented by the point cloud. In other examples the selection of data points may be delocalised by a jitter. For example, dot products may be taken between vectors which are not adjacent but are separated by a variable or pre-determined distance. Similarly, the selection of vectors for analysis can be made such that it 'skips' a vector in linear alignment. This is illustrated in FIG. 3 where vectors v1 and v3 have been chosen for taking a dot product analysis, skipping the intermediate vector v2 between them.

Step S504: Output the smoothness term based on an average value of the dot product throughout the point cloud.

The smoothness term is ideally representative of the result of taking the dot product of pairs of vectors across a surface of interest. The smoothness term can be obtained for example by taking all of the dot product values across the data points and taking an average such as a mean value. In other implementations, other averages can be used such as a median or modal value.

In particular, the smoothness term can be obtained by the formula $$S = 1 - \left| \sum_{i=0}^{n-1} \frac{v_i \cdot v_{i+1}}{n} \right|$$

where $v_i$ and $v_{i+1}$ are pairs of vectors being examined in each iteration (steps S501 and S502), and n is the number of vectors constructed in the point set during the process (i.e., the number of vectors constructed in steps S501 to S503). The dot products may be a normalised dot product, such that each dot product within the summation is between 0 and 1. The smoothness score here is calculated by starting from 1 and subtracting the result of summing the dot products across all of the vectors in the chosen set. This calculation effectively measures how rough or mis-aligned the surface data points are, such that a high alignment results in a low S term. Similar formulations can be employed, for example where a high alignment results in a high S term, as long as the calculated term provides a representation of the result of vector multiplying the chosen vectors within the data point set, and therefore a representation of the surface smoothness.

It will be appreciated that during training a GAN, the output is intended to increasingly accurately approximate a reference model that is correctly smooth where desired, as in point cloud 120 of FIG. 1. However, a reference model may comprise a mix of geometry that is legitimately locally not smooth; for example a cube comprises six smooth surfaces, but is not smooth when considered at each edge or corner.

Accordingly, in a variant embodiment of the description, where a surface of a reference model changes direction or deviates by more than a threshold amount within a given distance (for example, where a change in local surface gradient exceeds a threshold amount), then that location can be considered legitimately not smooth. Subsequently, neighbouring points in the corresponding generated model are not selected together if they are bisected by or otherwise span that location. Hence for example adjacent points on either side of an edge of a cube are not paired, and nor are points from different facets of a corner. Alternatively or in addition, the contribution to the smoothness term for respective dot products can be weighted or scaled as a function of their proximity to such legitimately not smooth locations.

Similarly, alternatively or in addition the contribution to the smoothness term for respective dot products can be weighted or scaled as a function of the corresponding local change in surface gradient in the reference model; in this way, referring again to the point cloud 120 of FIG. 1, there will be a greater loss for not being smooth on the torso of the figure (which has a small change in gradient), but a smaller loss for not being smooth at the figure's fingertips (which may be considered themselves less smooth, or to have a higher spatial frequency, themselves). Hence contributions to the smoothness term from respective neighbouring pairs of vectors can be responsive to a corresponding local smoothness of the reference model, and so the overall smoothness cost applied to the machine learning system can be adaptive to the local smoothness of the reference model.

As noted above, aspects of the present disclosure are particularly suited for use in generative adversarial networks. In such applications, a system is provided which includes a generator of a GAN comprising one or more processors and a discriminator of a GAN comprising one or more processors. The one or more processors may be shared. The generator is configured to receive a noise vector as an input and to generate a first point cloud comprising a first set of generated 3D data points, representing an object or a scene. The discriminator is configured to predict whether the object or scene depicted by the first point cloud generated by the generator is statistically similar or identical to an object or scene represented in one or more point clouds in a training set of point clouds. The discriminator calculates a loss function representative of the extent to which the point cloud generated by the generator can be determined to be similar or identical to a point cloud in the training set. The loss function comprises a smoothness term as set out herein, which is communicated to the generator which in turn learns from the result of the previous iteration and generates a second point cloud based on the first point cloud and the resulting loss function value. The process is repeated until a threshold loss function value is reached at which point the candidate point cloud generated by the generator is accepted as an output. The resulting GAN may also be an output of the process.

It will be appreciated that the methods described herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 6:
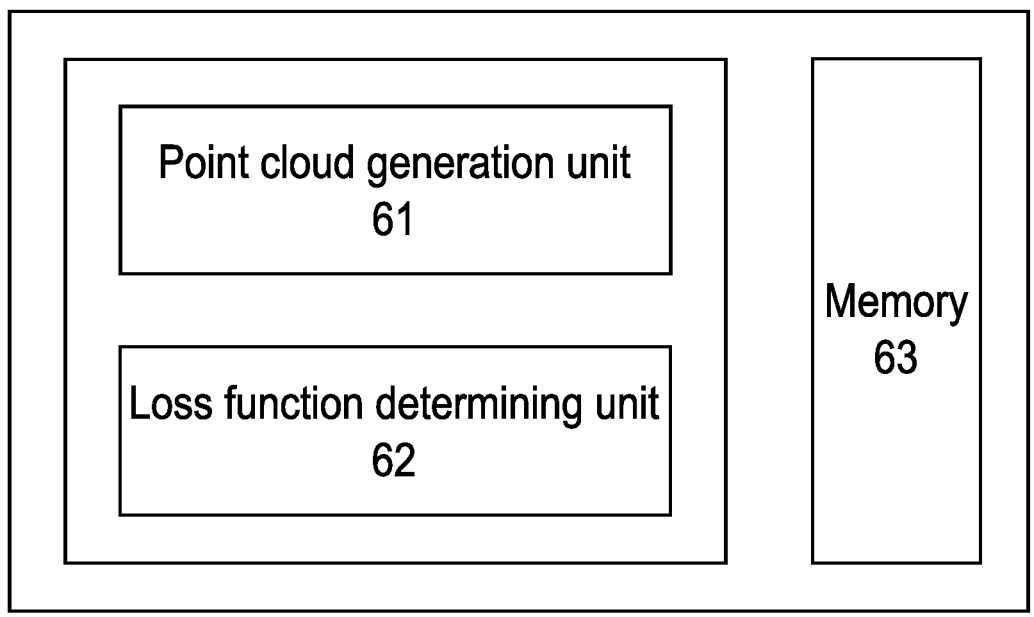
FIG. 6 schematically illustrates an example system in accordance with an aspect of the disclosure.

An aspect of the disclosure further provides a system, a schematic illustration of which is shown in FIG. 6. The system comprises a memory 63, a point cloud generation unit 61 and a loss function determining unit 62. The point cloud generation unit 61 is configured to generate a first point cloud comprising a first set of generated data points, in accordance with step S401 described above. The loss function determining unit 62 is arranged to calculate a loss function representative of the quality of the first point cloud generated by the point cloud generation unit, in accordance with step S402 described above. The loss function determining unit is configured to send, to the point cloud generation unit, a signal indicative of the loss function calculated for the first point cloud. The point cloud generation unit is configured to receive the signal indicative of the loss function from the loss function determining unit, and to generate a second point cloud comprising a second set of generated data points based at least in part on the calculated loss function of the first point cloud.

The loss function determining unit can further include a vector analysis module, configured to construct vectors between neighbouring data points in a point cloud generated by the point cloud generation unit. In particular, once the point cloud generation unit 61 generates a first point cloud, the vector analysis unit is configured to receive the first point cloud, construct a first vector between two neighbouring data points in the point cloud and a second vector between two other neighbouring data points in the point cloud, and calculate a dot product between the first vector and the second vector. The vector analysis module is further configured to repeat the process by taking dot products of pairs of neighbouring vectors throughout the point cloud, and output a smoothness term based on an average value of the dot product throughout the point cloud. The vector analysis module can be configured to receive a candidate point cloud sent directly from the point cloud generation unit, or configured to access the memory 63 on which a candidate point cloud is stored. Optionally the vector analysis module can, as noted herein, refer to the local smoothness (e.g. gradient change) of the reference model (e.g. the training model or models, such as a model being used by the discriminator of the GAN as reference), and modify contributions to the smoothness term from neighbouring points accordingly, and/or adjust the proportion of the smoothness term within the loss value, for example based on a global smoothness value for the reference object.

The point cloud generation unit 61 can access the memory and can store generated point clouds at the memory 63. Similarly, the loss function determining unit can access the memory 63 and can determine the loss function of point clouds stored in the memory 63. Alternatively, or in combination, the point cloud generation unit and the loss function determining unit can be connected such that point cloud data can be directly communicated between the two units. The point cloud generation unit and the loss function determining unit can be located on one or more processors of the system. In some examples the point cloud generation unit and the loss function determining unit are located on the same processor. In other examples the point cloud generation unit and the loss function determining unit are located on separate processors. The memory 63 may store one or more GANs to be accessed by the point cloud generation unit 61 and/or the loss function determining unit 62.

The system can be employed using one or more GANs for generating the point clouds. In such a case, the point cloud generation unit can be operated by one or more generators of a GAN, and the loss function determining unit can be operated by one or more discriminators of a GAN. With such a configuration the generator and discriminator can be stored on a memory and operated to access the point cloud generation unit and loss function determining unit on the one or more processors.

A GAN or other machine learning system trained using any of the methods and techniques described herein may subsequently be used to generate new point clouds, for example as part of an asset generation system. Such an asset generation system may be made part of a development kit or entertainment device by adapting it using suitable software instruction. Hence a system for point cloud generation may comprise a point cloud generation processor (e.g. a development kit, entertainment device, or server processor) adapted (for example by suitable software instruction) to generate point clouds using a machine learning system previously trained using any of the techniques described elsewhere herein, for example on a system as described elsewhere herein.

Hence in an embodiment of the present description a GAN or other machine learning system trained using the methods and techniques described herein may be used to generate new point clouds that are then used in a render pipeline (for example as the basis for polygons for conventional rendering, or directly for voxel or other point cloud based rendering) to generate rendered images of the object based on the point cloud generated by the trained GAN.

Accordingly in an embodiment of the present description, a method of point cloud generation also comprises the step of rendering an image based upon the second point cloud, where the second point cloud is a point cloud generated after a training event (based upon the loss function with a smoothness term as described herein) has taken place, and outputting the image for display and/or displaying it. Advantageously this enables rendered images generated using the above techniques to be created more quickly using smoother point clouds, which in turn also reduce computational load for downstream corrective actions such as fixing or adjusting vertices in polygon meshes and the like.

The invention claimed is:

1. A method of point cloud generation comprising:
generating, by a processor, a first point cloud comprising a first set of generated data points;
calculating, by the processor, a loss function representative of quality of the first point cloud, the loss function comprising a smoothness term obtained by constructing vectors between neighbouring data points in the point cloud, performing vector multiplication between neighbouring pairs of vectors, and outputting a smoothness term based on the result of the vector multiplication, wherein the smoothness term, S, for the point cloud is obtained by taking an average value of a dot product between neighbouring vectors in the point cloud and is calculated as:

$$S = 1 - \left| \frac{\sum_{i=0}^{n-1} v_i \cdot v_{i+1}}{n} \right|$$

where $v_i$ and $v_{i+1}$ are neighbouring pairs of vectors each constructed between neighbouring data points in the point cloud, and n is a total number of vectors constructed in the data point set; and
generating, by the processor, a second point cloud comprising a second set of generated data points based at least in part on the calculated loss function of the first point cloud.

2. The method according to claim 1, in which contributions to the smoothness term from respective neighbouring pairs of vectors is responsive to a corresponding local smoothness of a reference model.

3. The method according to claim 1, wherein the method comprises an initial step of receiving, from a user, an input vicinity control, and wherein the vector multiplication is done between vectors within a spatial vicinity corresponding to the input vicinity control.

4. The method according to claim 1, wherein the first and second point clouds are generated by a machine learning system that is updated responsive to the loss function between generation of the first and second point clouds.

5. The method according to claim 1, wherein the step of generating a first point cloud comprises inputting a noise vector to a generator of a generative adversarial network (GAN) trained to generate a set of generated data points and output the first point cloud.

6. The method according to claim 5, wherein the step of calculating a loss function comprises the steps of:
inputting the first point cloud to a discriminator of the GAN, trained to analyse the point cloud and output a binary cross entropy (BCE) term;
calculating the smoothness term; and
combining a pre-determined ratio of the BCE term and the smoothness term to form the loss function.

7. The method according to claim 1, wherein the step of generating a second point cloud comprises comparing the smoothness term of the first point cloud to a threshold smoothness value and generating the second point cloud based at least in part on the comparison.

8. The method according to claim 7, wherein the threshold smoothness value is determined by calculating a smoothness term of one or more training point cloud data used to train a generative adversarial network (GAN).

9. A non-transitory computer-readable medium encoded with a computer program comprising computer-implemented instructions that, when run on a computer, cause the computer to implement a method of point cloud generation comprising:
generating, by a processor, a first point cloud comprising a first set of generated data points;
calculating, by the processor, a loss function representative of quality of the first point cloud, the loss function comprising a smoothness term obtained by constructing vectors between neighbouring data points in the point cloud, performing vector multiplication between neighbouring pairs of vectors, and outputting a smoothness term based on the result of the vector multiplication, wherein the smoothness term, S, for the point cloud is obtained by taking an average value of a dot product between neighbouring vectors in the point cloud and is calculated as:

$$S = 1 - \left| \frac{\sum_{i=0}^{n-1} v_i \cdot v_{i+1}}{n} \right|$$

where $v_i$ and $v_{i+1}$ are neighbouring pairs of vectors each constructed between neighbouring data points in the point cloud, and n is a total number of vectors constructed in the data point set; and generating, by the processor, a second point cloud comprising a second set of generated data points based at least in part on the calculated loss function of the first point cloud.

10. A system for point cloud generation comprising one or more processors comprising:
a point cloud generation unit, configured to generate a first point cloud comprising a first set of generated data points;
a loss function determining unit, configured to calculate a loss function representative of quality of the first point cloud, the loss function comprising a smoothness term obtained by constructing vectors between neighbouring data points in the point cloud, perform vector multiplication between neighbouring pairs of vectors and output a smoothness term based on the result of vector multiplication, wherein the smoothness term, S, for the point cloud is obtained by taking an average value of a dot product between neighbouring vectors in the point cloud and is calculated as:

$$S = 1 - \left| \frac{\sum_{i=0}^{n-1} v_i \cdot v_{i+1}}{n} \right|$$

where $v_i$ and $v_{i+1}$ are neighbouring pairs of vectors each constructed between neighbouring data points in the point cloud, and n is a total number of vectors constructed in the data point set; and wherein
the point cloud generation unit is further configured to generate a second point cloud comprising a second set of generated data points based at least in part on the calculated loss function of the first point cloud.

11. A system according to claim 10, further comprising a memory, wherein the memory includes at least one generator of a generative adversarial network (GAN) and at least one discriminator of a GAN, wherein the generator and the discriminator are respectively configured to operate the point cloud generation unit and the loss function determining unit.

12. A system according to claim 11, wherein the point cloud generation unit is configured to store generated point clouds on the memory and the loss function determining unit is arranged to access the memory and retrieve generated point clouds from the memory.

13. A system for point cloud generation comprising:
a point cloud generation processor adapted to generate point clouds using a machine learning system previously trained using the system of claim 10.

* * * * *